March 17, 1959  J. J. AID ET AL  2,878,145
POLYETHYLENE RESIN COATED FIBROUS MATERIAL
Filed Nov. 17, 1954
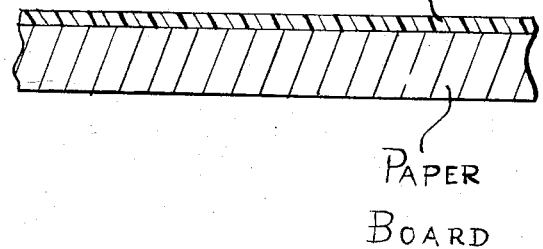
JOSEPH J. AID
EDWARD G. PAXTON, JR.
INVENTORS
BY
Pollard, Johnston, Smythe & Robertson
ATTORNEYS

United States Patent Office 2,878,145
Patented Mar. 17, 1959

2,878,145

POLYETHYLENE RESIN COATED FIBROUS MATERIAL

Joseph J. Aid, Quaker Hill, and Edward G. Paxton, Jr., Norwich, Conn., assignors to Continental Can Company, Inc., a corporation of New York Application November 17, 1954, Serial No. 469,544

3 Claims. (Cl. 117—145)

This invention relates to paperboard and other fibrous material coated with a continuous film of a polyethylene resin-aluminum powder composition, and also to a process for obtaining an opaque, aluminum foil-like surface on paperboard, paper, cloth and like materials in sheet form involving extrusion coating directly on the surfaces of the fibrous material.

Since the development of the "straight-die" for extrusion coating of polyethylene, many manufacturers of paperboard and converters of paperboard products have been aware of the fact that the inherent characteristics of polyethylene coated board make it suitable for a number of end uses. However, with the exception of a few instances, the utilization of polyethylene has not reached its full potentials primarily because other competitive products are generally somewhat equally as serviceable for certain uses and at the same time have a more favorable or pleasing appearance and thereby greater customer acceptance. These other products are primarily conventional greaseproof, glassine or parchment laminates and particularly the so-called opaque grades combined to paperboard with either wax or "paste" type adhesives that result in a white and appealing surface. Wax adhesives are used when moisture vapor resistance is desired and the resulting product has proven quite serviceable for thirty years or more for packaging many items.

Past experience in attempting to utilize and evaluate extrusion coated polyethylene board has shown quite clearly that competitive laminated products such as mentioned above are generally acceptable products mainly because of their appearance. Due to their whiteness and opacity, the laminates could be applied to the "news" back or other bottom liner without any appreciable show-through of that side of the board, the side normally adjacent to the packaged contents because the laminate generally serves its utility on the inside of the carton.

Unmodified polyethylene films in a practical thickness range for boxboard lining as heretofore employed are relatively clear films. Manufacturers of the resin have been and are constantly striving to improve its clarity and therefore the polyethylene coated "news" side of the board as now produced has the same general appearance as the uncoated board.

Although there may be some minor adverse factors that have retarded the use of clear polyethylene on the news side of paperboard, its relatively unappealing characteristic with respect to appearance as compared to prior laminated products applied to the same board has been one of the major factors that has limited its use to date. There are several methods by which whiteness or a more appealing surface can be attained with a clear polyethylene film which have been investigated and generally found to be impractical either because of costs or the requirement of special equipment not conventionally available to paperboard manufacturers. The desired whiteness is obtainable by (1) coating a clear film over bleached or white fiber, (2) coating a clear film over a white surface attained by mineral coating, and (3) incorporating a whitening agent in the clear resin before extrusion coating.

The first method referred to above seems to be the simplest method of attaining the desired appearance, but the cost of incorporating a white liner on the back of paperboard has made this method prohibitive in relation to the competitive products hereinbefore mentioned. The second method has possibilities for the few manufacturers who are equipped to coat the back of the sheet with mineral during the process of manufacturing the paperboard. "Off-machine" coating of the mineral on the back side is also prohibitive costwise. The third method, that is, incorporating a whitening agent in the resin before extrusion, has been investigated and it was found that the desired whiteness and opacity could not be attained in the thin films that are otherwise serviceable and which are generally required in relation to the limitation of the amount of polyethylene that can be afforded when considering the cost of competitive laminated products. A white and opaque film can be obtained by the last method but the thickness of the required coating makes it prohibitive for most of the intended end uses.

An object of the invention is to make it possible to apply to paperboard an opaque attractive resin film coating by the use of a resin composition and a coating process which is easily applied and low or competitive in cost. Another object is to make it possible to apply thinner, but opaque or substantially opaque, films of polyethylene resins upon fibrous sheetings and particularly upon the news side of paperboard.

The new products of the invention may be defined broadly as sheeted fibrous packaging material having a thin extruded coating composed essentially of a polyethylene extrusion resin having therein a small amount of a finely divided aluminum powder. No novelty is asserted to lie in the respective components, for any of the conventional grades of polyethylene resin suitable for extrusion coating may be used and any fine grade aluminum powder may be employed although aluminum flake powders generally give best results. The preferred aluminum is a 400 mesh polished powder, its average covering capacity in water being 29,000 square centimeters per gram. Although somewhat coarser powders could be used with decreasing merits, appreciably larger particles prevent attainment of the objects of the invention.

A most surprising feature of the invention is that there is permissible up to fifty percent reduction in the amount of polyethylene resin which can be successfully applied directly to the paperboard or other sheet material by the extrusion process when the metalized resin compositions of the invention are employed in place of conventional polyethylene coatings. A film thickness of .00025 of an inch of the resin composition containing only five percent aluminum (based on the amount of polyethylene) applied to unbleached fiber board provides good opacity, the coated surface being highly pleasing in appearance. If it is desired to increase the film thickness for any special reason, as for obtaining specific properties, it can be increased to 0.0005 of an inch or thicker, in which case the amount of aluminum flake can be reduced to two and a half percent or somewhat less. In no instance observed is more than five percent aluminum required. Otherwise stated, not more than 0.25 pound of aluminum powder per 1000 square feet of a film of a thickness of 1 mil is required to obtain the results hereinbefore described. Greater proportions of aluminum increase the cost.

Although thinness of film is a feature of the invention, it is possible of course to apply thicker films to suit special requirements. Film thicknesses of one mil or considerably less generally provide coated products of acceptable quality.

Any of several methods of compounding the aluminum powder with the polyethylene resin may be employed. The only requirement is that the aluminum powder be thoroughly distributed throughout the resin before it leaves the extrusion die. The most suitable method appears to be by the utilization of the so-called Banbury mixer or other somewhat similar mixer, into which the powder and the resin are introduced and mixed in the proportions desired in the final extruded product. The mixing can alternatively be accomplished by the use of "concentrates" where the ratio of powder to resin is considerably greater, the resulting mixture being pelletized and tumbled, or mixed with the unmodified polyethylene resin in the proper proportion to give a final extruded mixture of the desired ratio. Another method involves the tumbling of the conventional polyethylene pellets with the proper amount of aluminum powder so as to cause the powder to deposit as a coating on the individual pellets. Newly developed resin mixers adaptable to conventional extruders make this last mentioned method highly desirable although there is an explosion hazard if the operator is not skilled in compounding such mixtures.

Not only may the polyethylene resins of the wide range of molecular weights recommended for extrusion be employed but also the common modifications of said resin as where the resin is extended with lesser amounts of other ingredients as waxes or with appreciable amounts of Butyl rubber or the like whereby specially desired characteristics may be imparted to the final extruded film. Instead of plain aluminum powder, anodized aluminum powder may be employed to provide coated surfaces of metallic appearance such as gold or copper. Various dyes and pigments compatible with the resin-aluminum powder mixture can also be used in limited or small amounts.

With reference to the drawing, there is illustrated a cross-sectional view, much enlarged, of a preferred embodiment of the invention.

*Example 1*

A polyethylene extrusion coating resin having a molecular weight of 20,000–22,000 and a melt index of 1.6–2.6 (Alathon 10 by du Pont) together with 2.5% of its weight of a 400 mesh polished aluminum bronze powder is introduced into a Banbury mixer and worked until a homogeneous mass is obtained.

The coating composition obtained is thereupon applied to the news back of a paperboard by an extrusion coating using a straight-die in a thickness of 0.00075 inch. A highly satisfactory product is obtained.

*Example 2*

The coating composition produced in Example 1 is applied to the bottom liner of a paper board by an extrusion coating using a straight-die in a thickness of 1 mil.

*Example 3*

The process of Example 1 is followed except that the resin described therein is replaced by an extrusion coating resin containing a molecular weight of 20,000–22,000 and a melt index of 1.4–2.4 (DYNH, by Bakelite).

*Example 4*

The polyethylene resin identified in Example 1 is mixed with five percent of its weight of Butyl rubber powder or granules and with 2.5% of its weight of a very fine aluminum flake powder and worked until a homogeneous mass is obtained. The resulting composition is thereupon applied to the back of a paperboard by a straight-die extrusion process in a thickness of 0.00075 inch.

*Example 5*

The polyethylene resin described in Example 1 together with 5% of its weight of a 400 mesh aluminum flake powder is introduced into a Banbury mixer and worked until a homogeneous mass is obtained. The coating composition obtained is thereupon applied to a paperboard by extrusion coating using the straight-die in a thickness of one-half mil.

The advantages of the products and process of the invention are many. Generally considered, fibrous sheeting materials, and in particular paperboards, of excellent quality are obtained due to highly desirable films both in relation to appearance and functional characteristics. Although paperboard of white surface is not achieved, the result in appearance is "foil-like" which has proven to be acceptable for the packaging of foodstuffs and other products, as has foil and foil-lined paperboard and paper in the past. Nearly complete opacity and the foil-like appearance are attainable in very thin films with the result that an entirely new product is made available that can economically be applied even to the news side of paperboard, and at the same time be competitive with conventional laminated paperboard for many end uses.

In addition to the desired opacity, other advantages are attained. The addition of small amounts of aluminum powder permits the extrusion of the new resin composition to be made at a lower temperature because of the heat retaining capacity of the aluminum as well as the lubricating effect of the powder. The addition of aluminum powder to conventional polyethylene resin suitable for extrusion coating, in accordance with the invention, accomplishes at least five favorable results in comparison with those obtained when clear or unmodified polyethylene films are applied; namely, (1) the extruding machine can be operated at lower temperatures, resulting in savings of power or heat in-put and at the same time greatly reducing the possibilities of developing off-odors due to overheating. This factor is particularly important when the resulting film is to be utilized for the packaging of foodstuffs. (2) Even though lower extrusion temperatures are generally maintained, greater adhesion of the extruded film to the cellulose fiber surface is attained due to the fact that the aluminized film does not cool as quickly as unmodified polyethylenes. (3) The resulting film has more slip, or less drag, as compared to the unmodified film and as a result sheets of paperboard or cartons coated with the metalized polyethylene can be handled more easily on conventional converting equipment, such as cut and creasing presses, printing presses and carton gluing machines. For the same reason, the film has greater scuff resistance. (4) Because of its greater heat retention and possibly because of the fact it can be extruded at lower temperatures, the film can be extruded at lower calipers than ordinary clear polyethylene. (5) The resistance to moisture vapor penetration is greatly improved. This is achieved possibly because of the "leafing" effect of the fine aluminum powder. In a typical test, a clear film of one mil thickness on paperboard resulted in a moisture vapor transmission rate of approximately 1.5 units whereas the metalized film on the board of the present invention was approximately 0.75 unit. The moisture vapor transmission rate units are measured as grams of moisture vapor that permeate a 100 sq. inch area from an atmosphere of 90% relative humidity and 100° F. to a near zero relative humidity atmosphere at the same temeperature.

As compared with a clear film of polyethylene on paperboard, the metalized film has equivalent grease and oil resistance, and equal ability to take a score without fracturing. In no way does it appear to be inferior. Another favorable quality of the metalized film is its apparent lack of ability to stain. Oil and greases in contact with the film for long periods leave it totally unaffected as to appearance. This quality is an important factor in relation to food and other packaging where a non-staining surface against the packaged items is obviously advantageous in marketing.

It should be understood that the present invention is not limited to the herein disclosed specific details as to ingredients, procedures and proportions, except where

We claim:

1. Paperboard having a thin continuous opaque film extrusion-coated on a surface thereof composed essentially of a polyethylene extrusion resin and about 2.5 percent of a fine grade aluminum flake powder, the said film being about one mil down to about one-half mil in thickness.

2. A sheeted fibrous material extrusion-coated with an opaque film of a composition comprising a polyethylene extrusion resin adhering directly to said sheeted fibrous material, said resin having a fine grade aluminum powder distributed therethrough, the film being from about ¼ mil to 1 mil in thickness and the powder being present in an amount of about 2.5–5 percent of the resin, by weight.

3. A sheeted fibrous material extrusion-coated with a thin, continuous, opaque film of up to about one mil thickness of a composition comprising a polyethylene extrusion resin adhering directly to said sheeted fibrous material, said resin having distributed therethrough not less than 2.5% of a fine aluminum powder.

References Cited in the file of this patent

UNITED STATES PATENTS

| | | |
|---|---|---|
| 2,421,154 | Maier | May 27, 1947 |
| 2,472,680 | Pratt | June 7, 1949 |
| 2,714,571 | Irion et al. | Aug. 2, 1955 |
| 2,716,190 | Baker | Aug. 23, 1955 |
| 2,790,736 | McLaughlin et al. | Apr. 30, 1957 |

FOREIGN PATENTS

| | | |
|---|---|---|
| 600,687 | Great Britain | Apr. 15, 1948 |

OTHER REFERENCES

Goodwin: "Coloring Polyethylene," published in "Modern Plastics," August 1954, pp. 104–105.